United States Patent

[11] 3,613,844

| [72] | Inventors | Tadao Asano<br>Kariya;<br>Hiroji Yamaguchi, Kariya; Kazuo Ishikawa, Hoi gun, all of Japan |
|---|---|---|
| [21] | Appl. No. | 879,675 |
| [22] | Filed | Nov. 25, 1969 |
| [45] | Patented | Oct. 19, 1971 |
| [73] | Assignee | Aisin Seiki Kabushiki Kaisha<br>Kariya, Japan |
| [32] | Priority | Nov. 30, 1968 |
| [33] | | Japan |
| [31] | | 43/87854 |

[54] FORWARD-REVERSE AND BRAKE CONTROL VALVE
9 Claims, 7 Drawing Figs.

[52] U.S. Cl. .................................................. 192/4 C,
192/13 R, 137/625.22, 137/625.69
[51] Int. Cl. .......................................................... F16d 67/04

[50] Field of Search............................................ 192/4 A, 4 C, 13

[56] References Cited
UNITED STATES PATENTS

| 2,972,906 | 2/1961 | Schroeder ..................... | 192/4 A X |
| 3,292,752 | 12/1966 | Schuster et al. ............... | 192/4 A X |
| 3,386,523 | 6/1968 | Ruhl............................... | 192/4 C X |
| 3,398,819 | 8/1968 | Ruhl et al. ..................... | 192/4 A |
| 3,400,790 | 9/1968 | Ruhl et al. ..................... | 192/4 C |

*Primary Examiner*—Benjamin W. Wyche
*Attorney*—Pierce, Scheffler & Parker

ABSTRACT: A transmission control device for use on a self-propelled vehicle such as an industrial lift truck wherein a changeover valve connected both to a manually shiftable lever and to a brake pedal is rotatable and axially shiftable thereby so as to have clutch means communicate with or cutoff from a source of pressurized fluid.

FORWARD-REVERSE AND BRAKE CONTROL VALVE

SUMMARY OF THE INVENTION

This invention relates to transmissions, more particularly this invention concerns a transmission control device for a motor vehicle such as an industrial lift truck.

In the industrial lift truck and the like wherein an internal combustion engine is used not only to drive the vehicle, but also to actuate on, for instance, a lift-mechanism, it is desirable to be driven or braked without interrupting the operation of raising and lowering baggages, so as to prevent overloads on the transmission mechanism, a clutch means, the internal combustion engine and so on, and to be able to inch the vehicle forward and backward as desired by a brake pedal during the lifting or getting down operation.

In order to carry out the above-mentioned features, there have been provided various "inching" valves. These conventional valves, however, require complicated mechanisms and are expensive.

A principle object of this invention is to provide a new and improved inching valve means for industrial lift trucks and like vehicles which is compact and accomplishes the "inching" operation smoothly and efficiently.

Other characteristic features and advantages of the invention will furthermore be brought out in the description which follows below of forms of construction given solely by way of nonlimitative examples, reference being made to the accompanying drawings.

BRIEF DESCRIPTION OF THE DRAWINGS

In the drawings;

FIG. 5 is a sectional view of another embodiment of the control device in accordance with this invention;

FIG. 6 is a fragmentary section of the other control valve taken along the line VI—VI in FIG. 5; and FIG. 7 is a perspective view of a link mechanism to operate the control device of FIG. 5.

DETAILED DESCRIPTION

Figure 1:
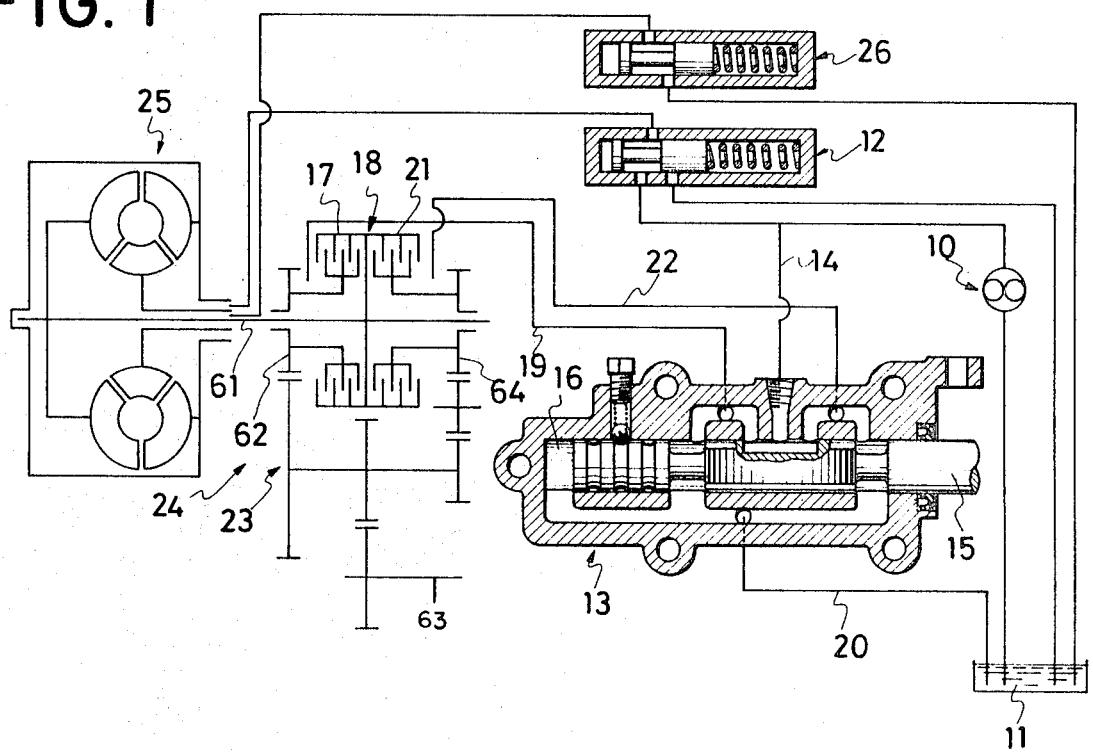
FIG. 1 is a general diagrammatic view of a fluid control system with one embodiment of a transmission control device according to the invention.

Generally, referring to FIG. 1 of the drawings, there is indicated at 10 an oil pump, which is driven by a prime mover (not shown). The oil pump 10 sends fluid under pressure sucked from a sump tank 11 to a regulating valve means 12. Fluid under pressure is led to a change-off device 13 through a conduit 14. A control valve 15, mounted axially slidably and rotatably in a cylindrical bore 16 of the changeover device 13, can occupy any one of three positions in the bore 16; a "forward" position in which fluid under pressure carried to the device 13 through the conduit 14 is conveyed to a forward clutch element 17 of a clutch means 18 by a fluid passage 19, a "neutral" position in which fluid under pressure admitted thereto through the conduit 14 is not conveyed to the clutch means 18 but fluid not under pressure is conveyed to the sump tank 11 through a drain pipe 20, and a "backward" position in which fluid under pressure is conveyed to a backward clutch element 21 of the clutch means 18 by a fluid passage 22.

A conventional transmission gear mechanism is represented generally by the numeral 23. A power transmission mechanism 24 comprises the clutch means 18 and the transmission gear mechanism 23, and it will be understood by persons skilled in the art that the gear mechanism 23 of FIG. 1 is provided for one forward drive and one reverse drive. A fluid torque converter unit 25 is driven by and positioned behind the prime mover and a fluid pressure of the torque converter unit 25 is regulated by an another regulating valve means 26.

Figure 2:
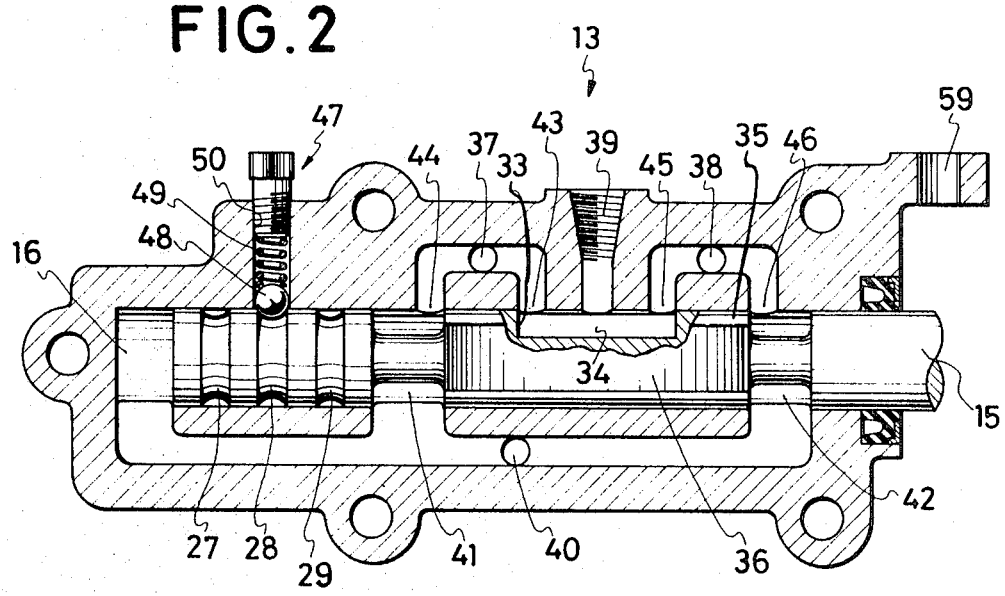
FIG. 2 is a sectional view of the control device of FIG. 1, which is represented in a larger scale.
Figure 3:
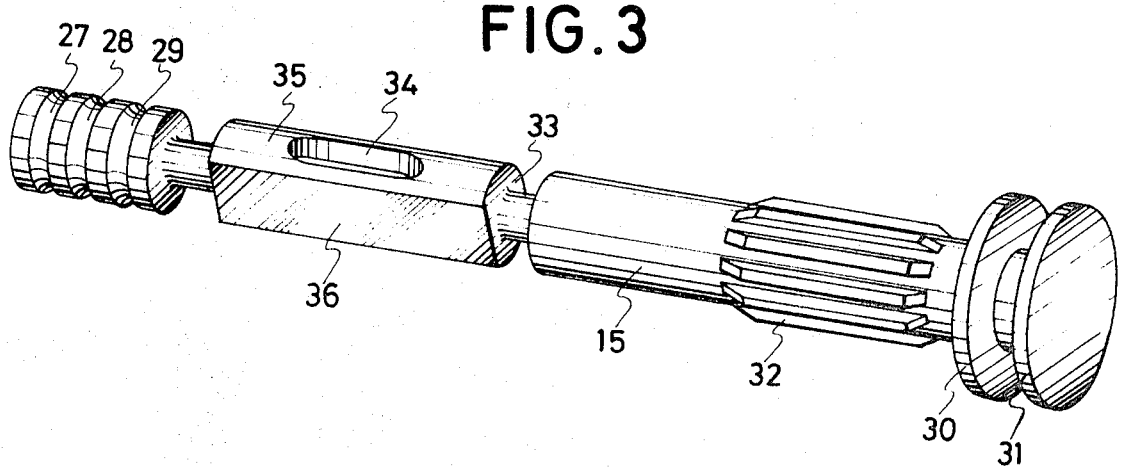
FIG. 3 is a perspective view of a valve means of the control device.

Specifically, referring to FIGS. 2 and 3, the control valve 15 comprises three circular grooves 27, 28 and 29 on a left hand, and two flanges 30 and 31 at the right end portion thereof as seen in FIG. 3. The valve 15 has axial splines 32 near the flanges 30 and 31. A substantially cylindrical central land 33 has an axial hollow 34 on the surface thereof which is surrounded by an enclosing part 35, and a plane surface 36 which is longitudinally provided and is radially close to the axial hollow 34.

In the change-off device 13, there are provided four ports 37, 38, 39 and 40 as shown in FIG. 2; a first port 37 and a second port 38 which are outflow ports are communicated with the forward clutch element 17 and the rearward clutch element 21, respectively, through the passageways 19 and 22, while a third port 39 which is an inflow port is communicated with the regulating valve means 12 through the conduit 14. A further port 40 which is a drain port is communicated with the sump tank 11 through the pipe 20.

Two passageways 41 and 42 are provided from the inflow port 39 to the drain port 40 through the first outflow port 37 and the second outflow port 38, respectively, in the bore 16 of the change-off device 13. One passageway 41 is led to the drain port 40 through openings 43 and 44 while the other passageway 42 is led thereto through openings 45 and 46. The longitudinal distance of the hollow 34 is substantially equal to the distance between the respective outer ends of the openings 43 and 45 as clearly shown in FIG. 2.

The three positions of the control valve 15 are positively located by locating means indicated generally by the reference numeral 47. The locating means 47 comprising a ball 48 and a spring 49 is arranged within a hole 50 which is opened outwardly of the change-off device 13 and plugged at the outer end thereof.

Figure 4:
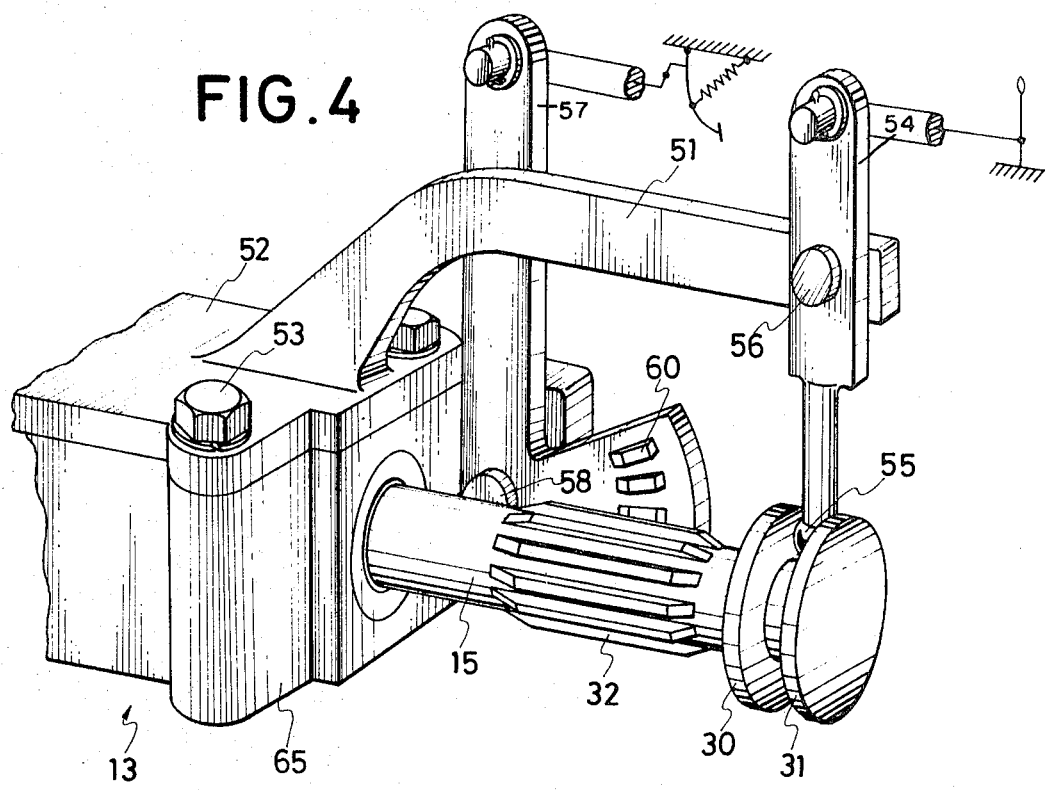
FIG. 4 is a perspective view of a link mechanism to operate the valve means.

A support arm 51, which is integral with an upper body 52 secured to a body 65 of the change-off device 13 by fixing bolts 53, is longitudinally extended as shown in FIG. 4. A shift lever 54 comprising a ball member 55 at the extreme portion thereof is pivotally mounted on the support arm 51 by a pivot pin 56, and is connected to a manually operative member (not shown). The ball member 55 is provided between the flanges 30 and 31, and the control valve 15 is capable of being axially moved by means of the shift lever 54.

A braking lever 57 connected to a brake pedal (not shown) is pivotally mounted on the changeover device 13 by a pin 58 which is carried in a hole 59 provided at the right end of the device 13 as seen in FIG. 2. The braking lever 57 is of a fan-shape at the lower portion thereof which has a spline 60 to engage with the spline 32 of the control valve 15. The spline 32 is of a length enough to receive the spline 60 wherever the control valve 15 may be axially shifted.

In operation, fluid under pressure conveyed from the oil pump 10 is transmitted to the change-off device 13 through the regulating valve 12 in which fluid is regulated under substantially constant pressure. When the control valve 15 is shifted forward (to the left when seen in FIG. 1 or 2) by the shifting lever 54 through the manually operative member, then the ball 48 of the locating means 47 is positioned in the circular groove 29 of the control valve 15, the pressurized fluid led to the change-off device 13 through the conduit 14 is sent to the fluid passage 19 through the inflow port 39, the opening 43 and the first outflow port 37, so that the forward clutch element 17 is actuated to have an output shaft 61 of the torque converter 25 engage with a forward input gear 62 of the transmission gear mechanism 23. The rotation of the output shaft 61 and the input gear 62 is transmitted to an output shaft 63 of the gear mechanism 23 in the same direction as the prime mover rotates, thus the vehicle is driven in the forward direction. Meanwhile, the opening 45 of the passageway 42 is shut by the enclosing part 35 of the control valve 15, so that no fluid under pressure is carried through the passageway 42.

When the control valve 15 is shifted rearward (to the right when seen in FIG. 1), then the ball 48 of the locating means 47 is positioned in the circular groove 27, the pressurized fluid is sent to the fluid passage 22 through the inflow port 39, the opening 45 and the second outflow port 38, so that the backward clutch element 21 is actuated to have the output shaft 61 of the torque converter 25 engage with a rearward input gear 64. The rotation of the torque converter unit 25 is admitted to the output shaft 61 in the direction opposite to the direction in which the prime mover is rotated, thus the vehicle is driven in the rearward direction. Meantime, the opening 43 of the fluid passageway 41 is closed by the enclosing part 35, so no fluid under pressure is conveyed through the passageway 41.

When the brake pedal is depressed, the braking lever 57 is rotated in the clockwise direction in FIG. 4. The control valve 15, which is engaged with the braking lever 57 wherever it may be positioned, is also rotated in the clockwise direction so that the plane surface 36 of the control valve 15 is faced to the inflow port 39, the openings 43 and 45, and the opening 44 and 46. Fluid admitted from the inlet port 39 is conveyed to the drain port 40 through the passageways 41 and 42 of the bore 16. Both of the forward clutch element 17 and the backward clutch element 21 are rendered inoperative because no pressurized fluid is conveyed thereto.

When the brake pedal is released, the control valve 15 is rotated to its former position by a returning spring (not shown) of the brake pedal.

Figures 5, 6, 7:
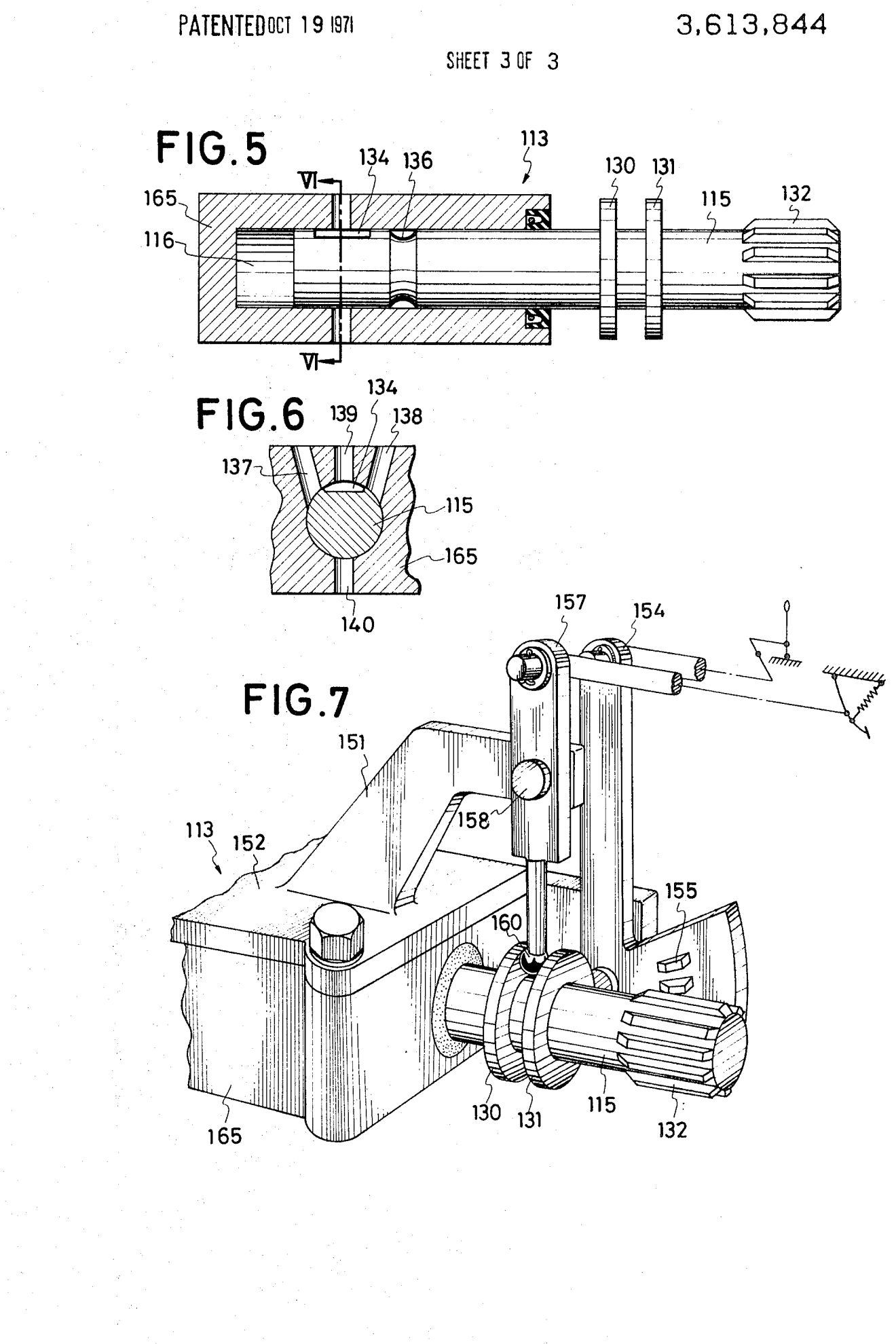

A modified embodiment of this invention is shown in FIG. 5 to FIG. 7. In these figures, similar parts to those employed in the foregoing embodiment have the same reference numerals plus 100. A control valve 115 is axially slidable and rotatable in a bore 116 of a change-off device 113. The control valve 115 comprises a hollow 134 at the left portion thereof, an annular groove 136 at the right of the hollow 134, and a spline 132 at the right end as viewed in FIG. 5. The spline 132 is engaged with a spline 155 of a shift lever 154 connected to a manually operative member (not shown), so that the control valve 115 is rotatable by the shift lever 154. A ball means 160 integrally provided on a braking lever 157 connected to a brake pedal (not shown) is mounted between two flanges 130 and 131 provided on the control valve 115 as seen in FIG. 7, and so the control valve 115 is axially shiftable by means of the braking lever 157 which is pivotally mounted by a pivot pin 158 on a support arm 151 integral with an upper body 152 of a housing 165 of the changeover device 113.

There are provided four ports 137, 138, 139 and 140 in the bore 116 of the change-off device 113 as viewed in FIG. 6 wherein the control valve 115 is positioned in neutral; an inflow port 139 communicated to an oil pump (not shown), outflow ports 137 and 138 communicated to a forward clutch element (not shown) and a rearward clutch element (again not shown), respectively, and a drain port 140 led to a sump tank (not shown).

In operation, when the control valve 115 is rotated in the counterclockwise direction in FIG. 6, fluid under pressure admitted through the inflow port 139 is passed to the outflow port 137 through the hollow 134, so that the forward clutch is engaged to drive the vehicle in the forward direction. At this time, no fluid under pressure is conveyed to the other outflow port 138 because it is closed by the control valve 115.

Contrary to this, when the control valve 115 is rotated in the clockwise direction in FIG. 6, fluid under pressure admitted through the inflow port 139 is conveyed to the outflow port 138 through the hollow 134, so that the backward clutch is engaged to drive the vehicle in the rearward direction. At this time, no pressurized fluid is conveyed to the other outflow port 137 because it is shut by the control valve 115.

When the brake pedal is depressed, the braking lever 157 is rotated around the pivot pin 158 in the clockwise direction in FIG. 7, so the control valve 115 is axially shifted to the left in FIG. 5 or 7, and the inflow port 139 is communicated with the annular groove 136 in place of the hollow 134 or the control valve 115. Fluid admitted through the inflow port 139 is conveyed to the drain port 140 through the annular groove 136 while no fluid under pressure is so admitted to the forward or rearward clutch element so that the vehicle is neither driven forward nor rearward.

When the brake pedal is released, the control valve 115 is returned to the former position by a backing spring (not shown) of the brake pedal.

We claim:

1. A transmission control device including a hydraulic clutch for a self-propelled vehicle having a brake pedal in which the hydraulic clutch may be engaged, disengaged or partially engaged by hydraulic fluid under pressure, comprising a control valve for controlling the flow of hydraulic fluid to the hydraulic clutch, said control valve having a longitudinal axis and being rotatably movable about its longitudinal axis and independently reciprocally movable along its longitudinal axis, a first means operable by hand and a second means operable by the brake pedal for moving said control valve, one of said means operable to move said control valve to a neutral position with respect to the hydraulic clutch and to a clutch-operating position and the other of said means operable to move said control valve from any one of the positions established by the one means to a second neutral position with respect to the hydraulic clutch and to return the control valve to its first position when rendered inoperable; each of said means being independently operable.

2. A transmission control device as claimed in claim 1 wherein said first hand-operated means moves said control valve reciprocally along its longitudinal axis, and wherein said second brake-operated means moves said control valve rotatable about its longitudinal axis.

3. A transmission control device as claimed in claim 2 wherein said control valve includes flange means thereon for engagement with said hand-operated means and further includes axial splines thereon for engagement with said brake-operated means.

4. A transmission control device as claimed in claim 2 and further comprising spring-loaded ball means for positively locating the longitudinal position of said control valve when operated by said hand-operated means.

5. A transmission control device as claimed in claim 4 wherein said control valve is provided with circular grooves to cooperate with said ball means.

6. A transmission control device as claimed in claim 2 wherein a cylindrical portion of said control valve is provided with an axially extending recess for controlling flow of the hydraulic fluid to the hydraulic clutch when moved axially and wherein said portion of the control valve is provided with at least one longitudinal flat surface adjacent the recess in said control valve for establishing the second neutral position when said control valve is rotated about its longitudinal axis.

7. A transmission control device as claimed in claim 1 wherein said first hand-operated means moves said control valve rotatably about its longitudinal axis and wherein said second brake-operated means moves said control valve reciprocally along its longitudinal axis.

8. A transmission control device as claimed in claim 7 wherein said control valve includes flange means thereon for engagement with said brake-operated means and further includes axial splines thereon for engagement with said hand-operated means.

9. A transmission control device as claimed in claim 7 wherein a cylindrical portion of said control valve is provided with a recess for controlling flow of the hydraulic fluid to the hydraulic clutch when said control valve is rotated about its axis and is further provided with an annular groove spaced from the recess for establishing the second neutral position when said control valve is moved axially.